US008621198B2

(12) United States Patent
Xia et al.

(10) Patent No.: US 8,621,198 B2
(45) Date of Patent: Dec. 31, 2013

(54) SIMPLIFIED PROTOCOL FOR CARRYING AUTHENTICATION FOR NETWORK ACCESS

(75) Inventors: Yangsong Xia, Nanjing (CN); John Kaippallimalil, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 824 days.

(21) Appl. No.: 12/199,985

(22) Filed: Aug. 28, 2008

(65) Prior Publication Data

US 2009/0210542 A1     Aug. 20, 2009

Related U.S. Application Data

(60) Provisional application No. 61/029,775, filed on Feb. 19, 2008.

(51) Int. Cl.
*G06F 21/00*     (2013.01)

(52) U.S. Cl.
USPC ............... 713/151; 380/270; 726/4; 709/229; 709/225; 709/223; 370/338; 713/168; 713/152

(58) Field of Classification Search
USPC .......................................... 709/229; 713/151
See application file for complete search history.

(56) References Cited

U.S. PATENT DOCUMENTS

| | | | | |
|---|---|---|---|---|
| 7,046,647 | B2 * | 5/2006 | Oba et al. ...................... | 370/331 |
| 2002/0023160 | A1 * | 2/2002 | Garrett et al. ................. | 709/229 |
| 2002/0069278 | A1 * | 6/2002 | Forslow ........................ | 709/225 |
| 2004/0062267 | A1 * | 4/2004 | Minami et al. ................ | 370/463 |
| 2006/0002329 | A1 | 1/2006 | Madour | |
| 2006/0002330 | A1 | 1/2006 | Madour | |
| 2006/0002351 | A1 | 1/2006 | Madour | |
| 2006/0002426 | A1 | 1/2006 | Madour | |
| 2006/0002557 | A1 * | 1/2006 | Madour ........................ | 380/270 |
| 2006/0013252 | A1 * | 1/2006 | Smith ........................... | 370/466 |
| 2006/0036733 | A1 * | 2/2006 | Fujimoto et al. ............. | 709/225 |

(Continued)

FOREIGN PATENT DOCUMENTS

WO    WO 2007/063176 A1    6/2007

OTHER PUBLICATIONS

Security for Grid Services|http://arxiv.org/ftp/cs/papers/0306/0306129.pdf|Welch et al.|pp. 1-10|2003.*

(Continued)

*Primary Examiner* — Mahfuzur Rahman
(74) *Attorney, Agent, or Firm* — Slater & Matsil, L.L.P.

(57) ABSTRACT

Methods and system for simplified Protocol for Carrying Authentication for Network Access (sPANA) are disclosed. In the broadband architecture such as Broadband forum or WiMAX forum, a Network Access server (NAS) is one IP hop away from a user. Therefore, it is possible to relax the need in PANA to obtain an IP address prior to authentication. A PANA client (PaC) may use an unspecified IP address (e.g. 0.0.0.0 in TPv4) as a source address for authentication. A PANA Authentication Agent (PAA) may use an IP broadcast address as a network layer destination address (e.g. 0xffffffff). The present invention defines PANA Attribute-Value Pairs (AVPs) and procedures that allow a Challenge-Handshake Authentication Protocol (CHAP) exchange to occur in PANA. The PANA CHAP support may facilitate smooth migration from Point-to-Point Protocol (PPP) sessions to IP sessions in a DSL Broadband network environment. The sPANA can be desirably compatible with the PANA.

19 Claims, 6 Drawing Sheets

(56) References Cited

U.S. PATENT DOCUMENTS

| | | | |
|---|---|---|---|
| 2006/0041742 A1* | 2/2006 | Oba | 713/151 |
| 2007/0028092 A1 | 2/2007 | Yegin | |
| 2007/0204155 A1* | 8/2007 | Dutta et al. | 713/168 |
| 2008/0025295 A1* | 1/2008 | Elliott et al. | 370/356 |
| 2008/0104678 A1* | 5/2008 | Hsu | 726/4 |
| 2009/0024732 A1* | 1/2009 | Hirano et al. | 709/223 |

OTHER PUBLICATIONS

International Application No. PCT/CN2009/070447, International Search Report and Written Opinion, 10 pages, May 28, 2009.

Bradner, S., "Key Words for Use in RFCs to Indicate Requirement Levels," RFC 2119, 3 pages, Mar. 1997.

Droms, R., "Dynamic Host Configuration Protocol," RFC 2131, 45 pages, Mar. 1997.

Droms, R. et al., "Dynamic Host Configuration Protocol for IPv6 (DHCPv6)," The Internet Society, RFC 3315, 129 pages, Jul. 2003.

Forsberg, D. et al., "Protocol for Carrying Authentication for Network Access (PANA)," The IETF Trust, RFC 5191, 46 pages, May 2008.

Jayaraman, P. et al., "Protocol for Carrying Authentication for Network Access (PANA) Framework," draft-ietf-pana-framework-10, The IETF Trust, 22 pages, Sep. 6, 2007.

Jayaraman, P. et al., "Protocol for Carrying Authentication for Network Access (PANA) Framework," The IETF Trust, RFC5193, 11 pages, May 2008.

Pruss, R. et al., "Authentication Extensions for the Dynamic Host Configuration Protocol," draft-pruss-dhcp-auth-dsl-02, The IETF Trust, 32 pages, Nov. 19, 2007.

Simpson, W., "The Point-To-Point Protocol (PPP)," RFC 1661, 54 pages, Jul. 1994.

Thomson, S. et al., "IPv6 Stateless Address Autoconfiguration," The IETF Trust, RFC 4862, 30 pages, Sep. 2007.

Yegin, A. et al., "Protocol for Carrying Authentication for Network Access (PANA) Requirements," The Internet Society, RFC 4058, 19 pages, May 2005.

"Extended European Search Report," International Application No. PCT/CN2009070447, Applicant: Huawei Technologies Co., Ltd., May 4, 2011, 8 pages.

Droms, R., "Dynamic Host Configuration Protocol," Network Working Group, RFC 2131, Mar. 1997, pp. 1-46.

Forsberg, D. et al., "Protocol for Carrying Authentication for Network Access (PANA)," PANA Working Group, Internet-Draft, Oct. 24, 2003, pp. 1-72.

* cited by examiner

SIMPLIFIED PROTOCOL FOR CARRYING AUTHENTICATION FOR NETWORK ACCESS

CROSS-REFERENCES TO RELATED APPLICATIONS

This application claims the benefit of U.S. Provisional Application No. 61/029,775, filed Feb. 19, 2008, entitled "Simplified Protocol For Carrying Authentication For Network Access (sPANA)," the entire disclosure of which is herein incorporated by reference for all purposes.

BACKGROUND OF THE INVENTION

The present invention relates to simplified Protocol for Carrying Authentication for Network Access (sPANA) which can be understood by reference to all the documents listed at the end of the specification, the entire contents of which are incorporated herein by reference for all purposes.

Digital Subscriber Line (DSL) broadband access networks have been evolving in aggregation technologies and protocols. One of the major transitions is from a Point-to-Point Protocol (PPP) [RFC1661] for a multi-protocol framing and dynamic endpoint configuration to a direct encapsulation of Internet Protocol (IP) and Dynamic Host Configuration Protocol (DHCP) for a dynamic endpoint configuration. The term used by the Broadband Forum for the network state associated with an authorized subscriber is "IP session" [RFC-5193]. Substitute authentication mechanisms may be needed to enable the transition from the PPP session to the IP session. Continuous efforts have been made on two aspects for IP session authentication, i.e. DHCP extension and PANA.

A DHCP extension is defined in [I-D.pruss-dhcp-auth-dsl] to provide authentication prior to configuration of a host. This solution aims to operate with existing RADIUS-based Authentication, Authorization and Accounting (AAA) infrastructure and Asynchronous Transfer Mode (ATM) or Ethernet based DSL Networks. The DHCP extension may only be a feasible short-term alternative solution.

The PANA is defined in [RFC-5191]. The PANA is a network-layer transport for Extensible Authentication Protocol (EAP) to enable network access authentication between clients and access networks. The PANA protocol may be run between a client, such as PANA Client (PaC), and a server, such as PANA Authentication Agent (PAA), to perform authentication and authorization for the network access service. The protocol messaging comprises a series of requests and answers. This PANA may be a desirable long-term solution. However, there are some problems when applying the PANA to existing DSL Broadband networks.

There still remains a need to develop techniques that make PANA suitable in a Broadband Forum architecture. In such an architecture, it is necessary to authenticate the subscriber before allocating an IP address.

BRIEF SUMMARY OF THE INVENTION

The present invention provides a variety of methods and techniques for Protocol for Carrying Authentication for Network Access (PANA) using unspecified IP addresses. The invention also provides a method for using Challenge-Handshake Authentication Protocol (CHAP) with sPANA to verify an identity of a host. The invention also provides a method for using sPANA to gain access of a host to a NAS and a RADIUS server and then continue a DHCP process to request an IP address. The sPANA may be used with CHAP or CHAP/EAP or any other protocol compatible with the sPANA.

Embodiments of the invention provide an unspecified IP address as a source address and a broadcast address as a network layer destination address for PANA. In one specific embodiment of the invention, the unspecified source IP address may have a format 0.0.0.0 in IPv4. The broadcast IP address may have a format of 0xffffffff in IPv4. The unspecified IP address may be used as a source IP address for framing a PANA request message. However, the unspecified IP address may not be used as a routable address as a destination IP address for the PANA responses. This unspecified IP address can resolve a contradicting requirement when an IP address is required to start a sequence in PANA to perform authentication and authorization for the network access server, while the IP address may only be given after authentication.

One embodiment of the invention provides that sPANA is performed substantially free from a pre-configured IP address in PaCs. When a PaC may be only one IP hop away from a PAA, sPANA works. The PaC may be a user end device. The PAA may be a Network Access Server (NAS).

In one set of the embodiments of the invention, a method for using CHAP with sPANA is provided. The sPANA uses unspecified IP address as a source address and a broadcast address as a destination address. Challenge-Handshake Authentication Protocol (CHAP) is commonly used with point-to-point protocol (PPP). The embodiment of the invention provides a use of CHAP with sPANA. CHAP can periodically verify the identity of a PaC by using a three-way handshake. The verification is based upon a shared secret, such as the client user's password. CHAP requires that both the client and server know the plaintext of the secret, although the secret is not sent over the network.

In another set of embodiments of the invention, a method for using sPANA to gain access of a PaC or a DHCP client to a NAS. The NAS acts as a DHCP relay to a DHCP server. Authentication protocol in sPANA may be CHAP or Extensible Authentication Protocol (EAP). Again, sPANA uses unspecified IP address as a source address and a broadcast address as a destination address.

A further embodiment of the invention provides a system for authenticating an entity, such as a host or PaC, based upon sPANA. The system comprises a transmitter configured to transmit PANA messages from the client (such as PCI, PAR) using an IP broadcast address as the network layer or IP destination address from a PAA to the PaC. In a particular embodiment, the IP broadcast address may have a format of 0xffffffff in IPv4. The system further comprises a receiver configured to receive PANA messages (such as PAR) using an unspecified IP address as the source IP address from the PaC. In a particular embodiment, the unspecified IP address may have a format of 0.0.0.0 in IPv4. Either the PaC or the PAA may initiate the sPANA session.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
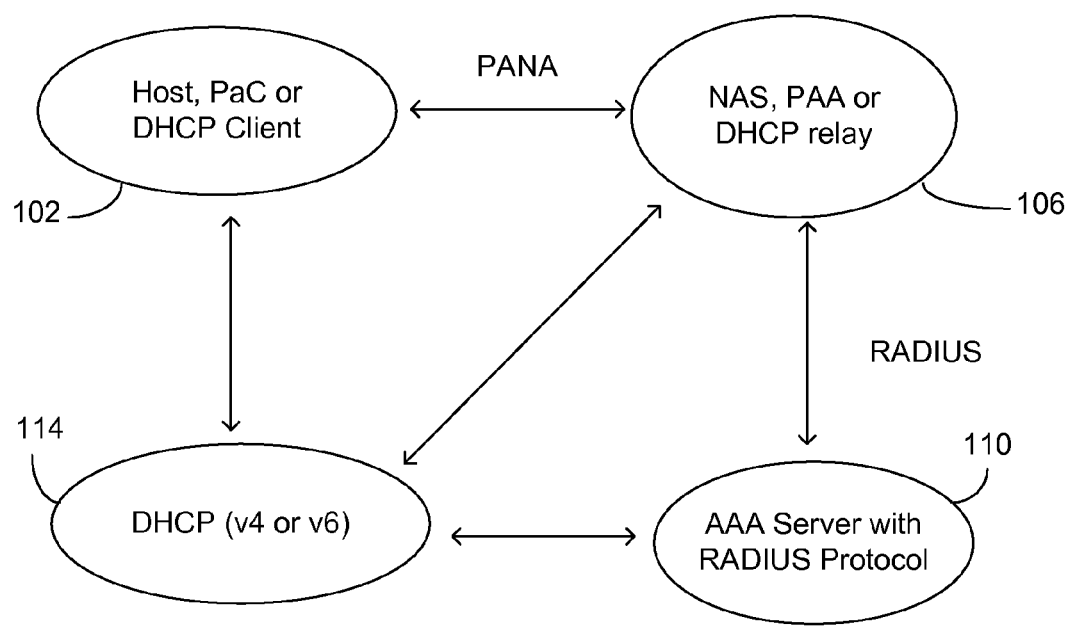
FIG. 1 is an exemplary PANA based authentication system.

FIG. 1 illustrates an exemplary PANA based authentication system 100. The system 100 includes a host 102, a Network Access Server (NAS) 106, a RADIUS server 110, and a DHCP server 114. The host 102 may be a PANA client (PaC) or a DHCP client. The NAS 106 may be a PANA Authentication-Agent (PAA) or a DHCP relay for authentication of the host 102 prior to requesting for an IP address from the DHCP server 114. The PaC may be a personal computer, a mobile phone, or other portable communication devices.

RADIUS is a network protocol that uses access servers to provide centralized management of access to large networks. RADIUS is commonly used by corporations managing access to the internet or internal networks employing a variety of network technologies including modems, DSL, and wireless.

The host 102 may send a PANA-Client-Initiation (PCI) message to the NAS 106 to gain access to the NAS 106. After the host 102 gains access to the NAS 106, The NAS 106 may send a RADIUS access request message to the RADIUS server 110, requesting authorization to grant access via the RADIUS protocol.

In general, an IP address may be given only after authentication of a host or entity. Authentication is associated with a process for verifying an identity of the host, while authorization refers to the granting of specific privileges that an authenticated person has the authority to perform a certain operation. Authentication occurs prior to authorization, while authorization may not occur without authentication.

However, PANA requires an IP address prior to beginning host authentication. This creates a conflict sequencing requirement for the IP address. For example, for an IP address configuration, [RFC-5191] and [I-D.ietf-pana-framework] require that a PANA Client (PaC) configures an IP address prior to starting the PANA. This requirement contradicts a general DSL assumption that a user authentication occurs before the assignment of an IP address. Furthermore, an assignment of the IP address may depend upon authentication that is obtained. This sequencing contradiction for the IP address becomes an obstacle when applying PANA to DSL networks.

As the IP address is required in the PANA, an unspecified IP address may begin a sequence in the PANA. The unspecified IP address may be used for framing in PANA, but may not be used for routing. Other methods may be used to route, for example, by Ethernet.

sPANA Operation

[RFC4058] identifies requirements for a link-layer agnostic protocol that allows a host and a network to authenticate each other for network access. The protocol design may be limited to define a messaging protocol (e.g. a carrier) that may allow authentication payload to be carried between the host/client and an agent/server in the access network. The carrier may not be limited to a particular authentication payload.

[RFC-5191] describes PANA as a network-layer transport for Extensible Authentication Protocol (EAP) to enable network access authentication between clients and access networks. [RFC-5191] also describes the PANA protocol that includes a series of request messages and answer messages. Each of the messages may carry zero or more Attribute-Value Pairs (AVPs) within a payload. The main payload of PANA is EAP that performs authentication. An IP address configuration is a prerequisite of performing the EAP.

In order for a smooth transition from a PPP session to an IP session in DSL networks, PANA CHAP authentication may be integrated with a RADIUS-based Authentication, Authorization and Accounting (AAA) infrastructure that is built based upon PPP CHAP authentication models.

One embodiment of the invention provides that sPANA may be performed substantially free from a pre-configured IP address in a PaC by using an unspecified IP address as a source address in an outgoing message and a broadcast address as a destination address in a reply message. The PaC may be a user end device. When the PaC may be only one IP hop away from a PAA or a Network Access Server (NAS), sPANA would work.

An authentication method negotiation mechanism may be introduced for sPANA multi-authentication method support. Some CHAP-related AVPs may be defined for the PAA to authenticate the PaC using CHAP.

A PANA session comprises several distinct phases, including Authentication and Authorization Phases, access phase, re-authentication phase, and termination phase. The authentication and authorization phases are provided to establish a sPANA session and to carry authentication payload between the host or PaC 102 and the NAS or PAA 106. The sPANA session may be initiated by either the PaC 102 or the PAA 106. The PAA 106 is responsible for verifying the credentials that are provided by the PaC 102 and authenticates the PaC 102 and authorizes network access to the PaC device 102.

In embodiments of the invention, messages from the PaC 102 to the PAA 106, such as PANA-Client-Initiation (PCI) and PANA-Auth-Answer (PAN), may use an unspecified IP address as a source IP address. Messages from the PAA to the PaC, PANA-Auth-Request (PAR), may use an IP broadcast address as an IP destination address.

In one embodiment, for a PaC-initiated Session the PaC may initiate a sPANA session by sending a PANA-Client-Initiation (PCI) message using an unspecified IP address (e.g. 0.0.0.0 in IPv4) as a source address to the PAA. The PAA that receives the PANA-Client-Initiation (PCI) message may respond to the PaC by replying a PANA-Auth-Request (PAR) message by using a broadcast address (e.g. 0xffffffff) as a network layer destination address. The PAR message may be forwarded by using a link layer unicast Media Access Control (MAC) address of the PaC.

In another embodiment, for a PAA-initiated Session the PAA may be triggered by other mechanisms. The PAA may send an unsolicited PANA-Auth-Request (PAR) to the PaC. The PAR message may be sent by using a broadcast address (e.g., 0xffffffff) as a network layer destination address. The PAR message may be forwarded by using a link layer unicast Media Access Control (MAC) address of the PaC.

Figure 2:
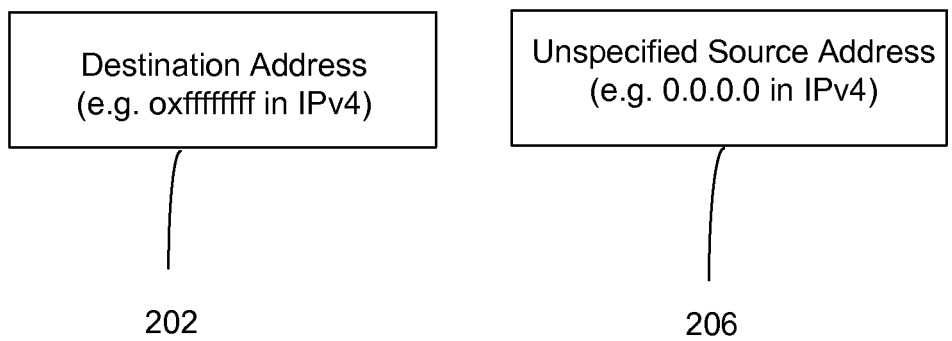
FIG. 2 illustrates exemplary formats of an unspecified IP address as a source address and a broadcast address as a destination address.

An IP address used in PANA may have an unspecified IP address as a source IP address, and a broadcast IP address as a destination address. FIG. 2 shows an exemplary format of the source IP address 206 and the destination P address 202. For example, the unspecified source address 206 may have a format of 0.0.0.0 in IPv4. The destination address 202 may have a format of 0xffffffff in IPv4. The unspecified source address and the destination address may have other formats in IPv6.

Authentication Method Negotiation and CHAP Support

Commonly, CHAP is used with PPP. CHAP may also be used with PANA, for example by Yegin, "Method and System for Enabling CHAP Authentication Over PANA without Using EAP", US Patent Application: 2007/0028092, the entire content of which is incorporated herein by reference for all purpose. In a particular embodiment of the invention, a method of using CHAP with PANA is provided to verify an identity of a host or PaC. PANA may be used to transport CHAP instead of PPP.

PANA as defined in [RFC-5191] supports EAP. For a smooth transition from a PPP session to an IP session in DSL networks, PANA CHAP authentication may be integrated with existing RADIUS-based AAA infrastructure that is built based upon PPP CHAP authentication models. Accordingly, a multi-authentication mechanism requires sPANA with an authentication method negotiation mechanism. Authentication Protocol attribute value pair (AVP) may be included in PANA-Client-Initiation (PCI), PANA-Auth-Request (PAR), and PANA-Auth-Answer (PAN).

In order to integrate with RADIUS CHAP, it is desired for a PANA Authentication Agent (PAA) to send a CHAP Challenge along with an identifier (ID), and Name to a PaC. The CHAP comprises a challenge, an Identifier (ID), and a Name. The PaC hashes the Challenge, Identifier (ID), Name, and Secret, and sends back the result in a CHAP Response to the PAA.

In a particular embodiment of the invention, an Authentication, Authorization, Accounting (AAA) server may be used with a RADIUS protocol, referred as RADIUS server. The PAA may send the CHAP Name, ID, Challenge and Response to the Remote Authentication Dial In User Service (RADIUS) server to verify the credentials. The Secret is not sent in the plaintext, and may be known to the RADIUS server and the PaC. The AAA server may be used with other protocols.

Figure 3:
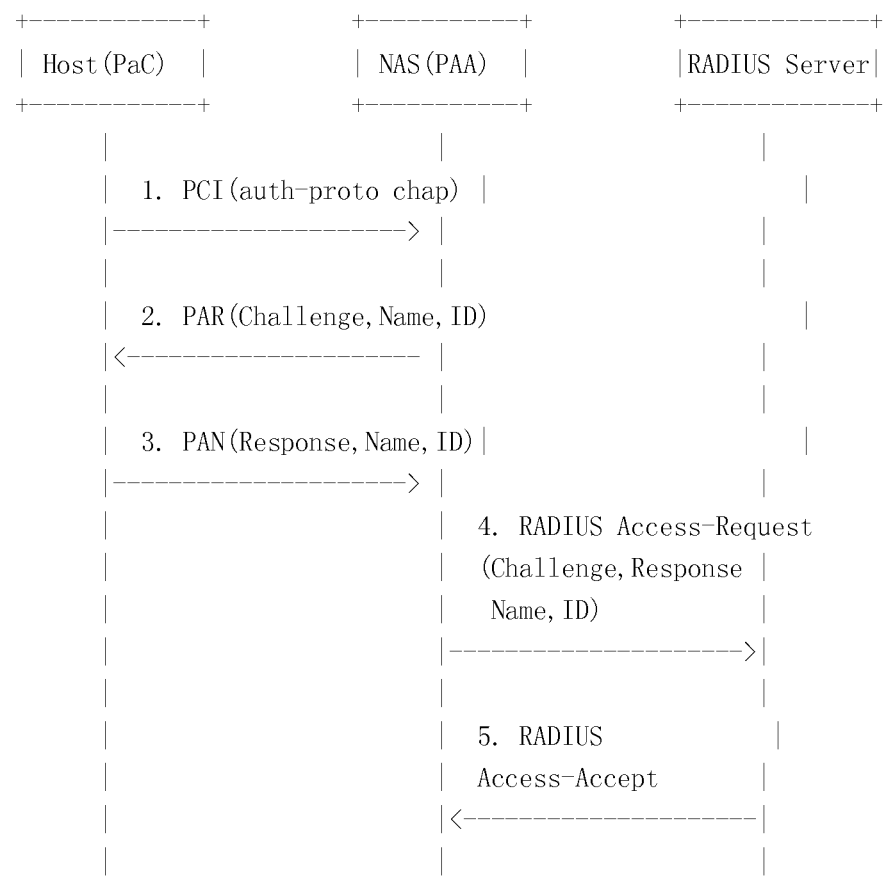
FIG. 3 shows a message flow of sPANA CHAP.

FIG. 3 illustrates a message flow of PANA CHAP. PANA messages include, among others, a PANA-Client-Initiation (PCI), a PANA-Auth-Request (PAR), and a PANA-Auth-Answer (PAN). Sequences 1-3 are performed between a host or PaC 102 and a NAS or PAA 106. A PANA Authentication Agent (PAA) is responsible to verify credentials provided by the PANA client (PaC) and to authorize network access to the access device. The PaC is responsible for providing credentials in order to prove its identity for network access authorization. The PAA and the EAP authenticator (and optionally the EAP server) are located in the same node. The authentication and authorization procedure may, according to the EAP model, also be offloaded to the back end Authentication, Authorization, and Accounting (AAA) infrastructure.

Referring to FIG. 3 now, at step 1, the host or PaC 102 sends a PCI message to a NAS or PAA 106 to initiate the authentication process. Next, the NAS or PAA 106 sends a PAR message with CHAP Challenge, Name and ID to verify the identity of the host. Then, the host or PaC 102 sends a PAN message to the NAS or PAA 106 with CHAP Response, Name and ID to acknowledge the receipt of the PAR.

Steps 4-5 are performed between the NAS 106 and RADIUS server 110. The NAS 106 may send a RADIUS Access-Request along with CHAP Challenge, Response Name and ID of the host to the RADIUS server to gain access to the RADIUS server. The RADIUS server 110 may grant the access by sending a RADIUS Access-Accept message to the NAS 106.

PANA further includes other phases, such as access phase, re-authentication phase, and termination phase. During an access phase to the network, if both the authentication and the authorization are successfully completed, the PaC gains access to the network and may initiate an IP address configuration immediately. DHCPv4 [RFC2131] may be used for IPv4 address allocation. In addition, DHCPv6 [RFC3315] and Stateless Address Auto-configuration [RFC4862] may be used for IPv6 address configuration. After an address configuration, the following operation is similar to that is described in IP Address Option defined in [RFC-5191].

The PANA session in the access phase may enter the re-authentication phase to extend the current session lifetime by re-executing authentication. The details are described in IP Address Option defined in [RFC-5191].

Furthermore, termination of a PANA session may be initiated either from the PaC (i.e., disconnect indication) or from the PAA (i.e., session revocation). Details are also included in IP Address Option defined in [RFC-5191].

Exemplary sPANA and DHCP Interoperability sPANA and PANA are compatible. If a PaC 102 gets an IP address before authentication, the PaC 102 may operate by using PANA defined in IP Address Option defined in [RFC-5191]. However, when PaC does not have an IP address before authentication, the embodiment of the invention provides a sPANA as a supplement to PANA.

Figure 4:
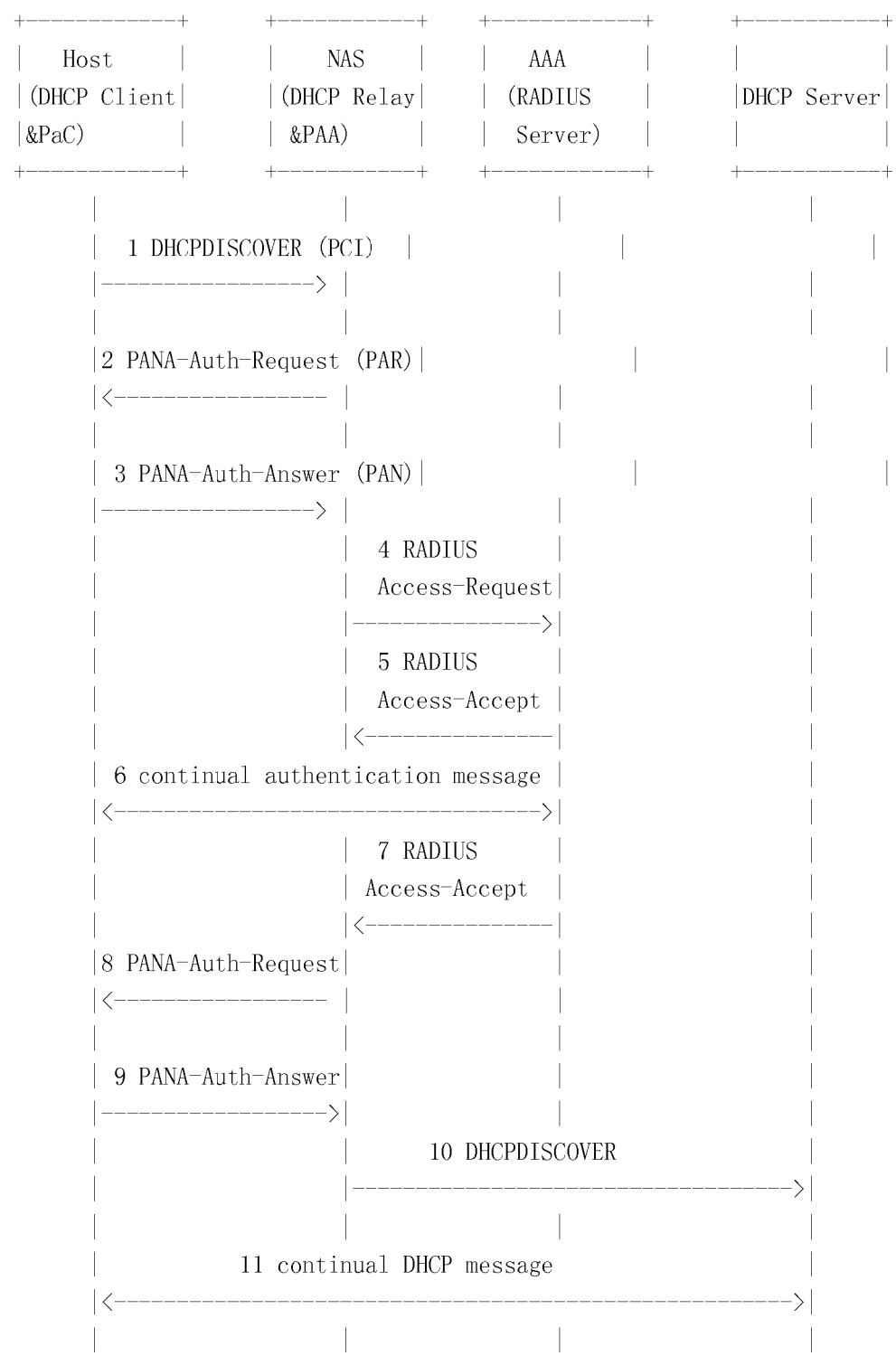
FIG. 4 shows a message flow of sPANA and DHCP interaction.

FIG. 4 illustrates an exemplary interaction between sPANA and DHCP for a case when a PaC 102 needs authentication to gain access to a NAS 106. There may be 11 communication sequences or steps among a host or PaC 102, a NAS or PAA 106, a RADIUS server 110 and a DHCP server 114. The host 102 may be a DHCP client or PaC, while the NAS 106 may be a DHCP relay or PAA. The RADIUS server 110 is a AAA server with RADIUS protocol.

Referring to FIG. 4 now, at the first step, a host 102 may initiate an address configuration by sending a DHCPDISCOVER message to a NAS server 106. At the next step, the NAS 106 may be triggered to send PANA-Auth-Request (PAR) for launching sPANA authentication when the NAS 106 receives the DHCPDISCOVER message from the host 102. Either EAP or CHAP authentication may be chosen by the NAS 106. The DHCPDISCOVER message may be buffered for resuming a DHCP process. At step 3, the host 102 may send back a PANA-Auth-Answer (PAN) message to the NAS 106 as a response to the PANA-Auth-Request (PAR) to acknowledge receipt of the PAR message.

Steps 4-5 include communication sequences between the NAS 106 and the RADIUS server 110. The NAS 106 may send a RADIUS Access-Request to the RADIUS server 110 to gain access to the RADIUS server. Then, the RADIUS server 110 may send back a RADIUS Access-Accept message to the NAS 106 to grant the access.

In one embodiment of the invention, CHAP authentication may be chosen. In another embodiment of the invention, EAP may be chosen as an authentication method. Continual authentication message exchanges are needed at step 6 if EAP authentication is selected.

Referring to FIG. 4 again, at step 7, after successful authentication, the RADIUS server 110 may send a RADIUS Access-Accept message to the NAS 106 for authorization of the network access of the host. Then, the NAS 106 may send PANA-Auth-Request (PAR) to the host 102 to complete the authentication. The host 102 may response with PANA-Auth-Answer (PAN) to the NAS 106 to acknowledge the receipt of the PAR.

At step 10, the NAS 106 may resume the DHCP process by relaying the DHCPDISCOVER to the DHCP server 114. Lastly, the DHCP process may continue between the host 102 and the DHCP server 114 while the NAS 106 serves as a DHCP relay. In a further embodiment of the invention, DHCP may be DHCPv4 or DHCPv6.

Exemplary Format of AVPs in sPANA

Attribute Value Pairs (AVPs) are generally used to encapsulate information relevant to the PANA messages. AVP format is defined in IP Address Option defined in [RFC-5191]. One embodiment of the invention provides a specific AVP, e.g. Authentication Protocol AVP.

Figure 5:
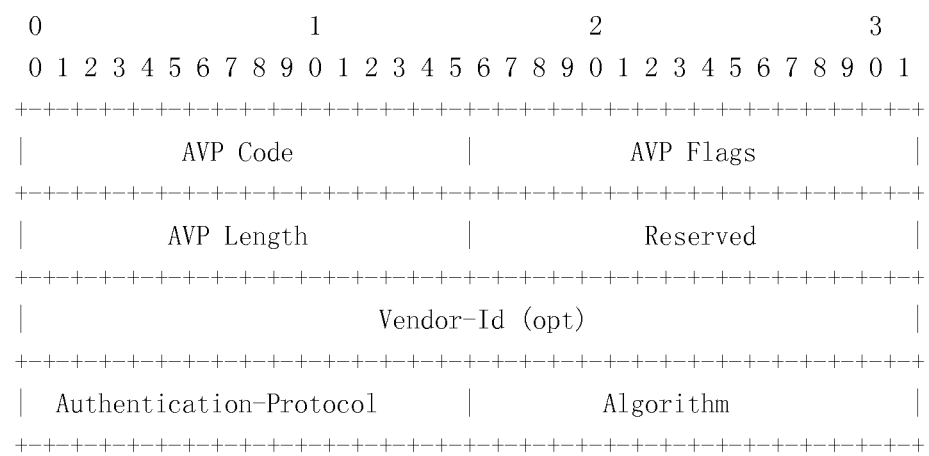
FIG. 5 illustrates an exemplary format of Authentication Protocol AVPs.

FIG. 5 defines the format of the Authentication Protocol AVP, which is sent between a PaC 102 and a PAA 106 to indicate preference of an authentication algorithm. The AVP Code may be determined by Internet Assigned Number Authority (IANA). The Authentication-Protocol may be either Challenge-Handshake Authentication Protocol (CHAP) or Extensible Authentication Protocol (EAP).

Figure 6:
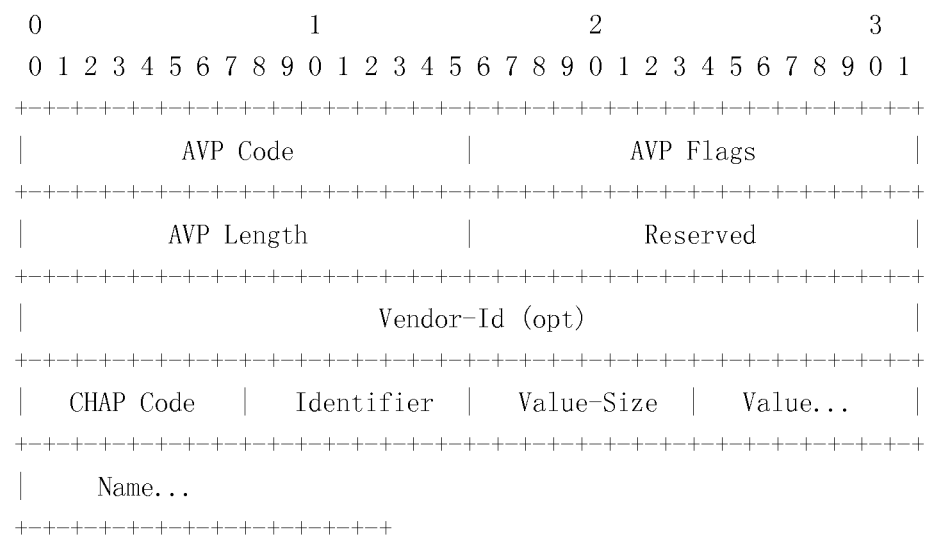
FIG. 6 illustrates an example of using CHAP authentication protocol in the Authentication Protocol AVP as shown in FIG. 5.

FIG. 6 shows an example of using a CHAP authentication protocol in the Authentication Protocol AVP as shown in FIG. 5. The CHAP Authentication AVP may be used between a PaC 102 and a PAA 106 to exchange CHAP authentication Data through a PANA-Auth-Request (PAR) and a PANA-Auth-Answer (PAN). The AVP Code may be determined by IANA. The CHAP Code comprises 1 for Challenge and 2 for Response. The Identifier field may be changed each time when a Challenge is sent. The Identifier may be copied from the Identifier field of the Challenge. The Value-Size field indicates a length of the Value-Size field. The Value field may be one or more octets.

Furthermore, a Challenge Value is a variable stream of octets. The Challenge Value may be changed each time when a Challenge message is sent. The length of the Challenge Value may depend upon the method that is used to generate the octets, and may be independent of the used hash algorithm.

A Response Value is the one-way hash that is calculated over a stream of octets including a Response Identifier, followed by (concatenated with) the "secret" and the Challenge Value. The length of the Response Value may depend upon the used hash algorithm.

The Name field includes one or more octets representing identification of a system that transmits a data packet. There are no limitations on the content of the name field. For example, the Name field may contain ASCII character strings or globally unique identifiers in ASN.1 syntax.

For security reason, the PANA CHAP mechanism may be one-way, although mutual authentication is available with the mechanism in IP Address Option defined in [RFC-5191]. Comparing to PANA in IP Address Option defined in [RFC-5191], the embodiment of the sPANA has similar degree of security to the PANA.

Entire contents of the following references are herein incorporated by reference for all purposes.

[RFC2119] is described in Bradner, S., "Key words for use in RFCs to Indicate Requirement Levels", BCP 14, RFC 2119, March 1997.

[RFC1661] is described in Simpson, W., "The Point-to-Point Protocol (PPP)," STD 51, RFC 1661, July 1994.

[RFC2131] is described in Droms, R., "Dynamic Host Configuration Protocol," RFC 2131, March 1997.

[RFC3315] is described in Droms, R., Bound, J., Volz, B., Lemon, T., Perkins, C., and M. Carney, "Dynamic Host Configuration Protocol for IPv6 (DHCPv6)," RFC 3315, July 2003.

[RFC4862] is described in Thomson, S., Narten, T., and T. Jinmei, "IPv6 Stateless Address Autoconfiguration," RFC 4862, September 2007.

[RFC-5193] is described in "Internet Protocol (IP) Sessions", WT 146 (work in progress), April 2007.

[RFC-5191] is described in Forsberg, D., Ohba, Y., Patil, B., Tschofenig, H., and A. Yegin, "Protocol for Carrying Authentication for Network Access (PANA)," draft-ietf-pana-pana-18 (work in progress), September 2007.

[I-D.ietf-pana-framework] is described in Jayaraman, P., Ohba, Y., Parthasarathy, M., and A. Yegin, "Protocol for Carrying Authentication for Network Access (PANA) Framework", draft-ietf-pana-framework-10 (work in progress), September 2007.

[I-D.pruss-dhcp-auth-dsl] is described in Pruss, R., Zorn, G., Maglione, R., and L. Yizhou, "Authentication Extensions for the Dynamic Host Configuration Protocol," draft-pruss-dhcp-auth-dsl-02 (work in progress), November 2007.

[RFC4058] is described in Yegin, A., Ohba, Y., Penno, R., Tsirtsis, G., and C. Wang, "Protocol for Carrying Authentication for Network Access (PANA) Requirements," RFC 4058, May 2005.

The present description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An authentication method comprising:
   authenticating a communication entity in accordance with a simplified protocol for carrying authentication for network access (sPANA), the authenticating comprising
   transmitting a first PANA message using an unspecified Internet Protocol (IP) address as a source IP address from a host or a PANA-authentication-Client (PaC) to a Network Access Server (NAS) or a PANA-Authentication-Agent (PAA); and
   receiving a second PANA message having an IP broadcast address as a network layer destination address from the NAS or the PAA at the host or the PaC, wherein the second PANA message comprises a PaC link layer destination address comprising a unicast Media Access Control (MAC) address.

2. The method of claim 1, wherein the first PANA message comprises PANA Client Initiation (PCI) and PANA-Auth-Answer (PAN).

3. The method of claim 1, wherein the second PANA message comprises PANA-Auth-Request (PAR).

4. The method of claim 1, wherein the unspecified IP address and the IP broadcast address comprise IPv4 and IPv6.

5. The method of claim 4, wherein the unspecified IP address has a value of 0.0.0.0 for IPv4.

6. The method of claim 4 wherein the IP broadcast-address has a value of 0xffffffff for IPv4.

7. An authentication method comprising:
   authenticating a communicating entity in accordance with a simplified protocol for carrying authentication for network access (sPANA) and challenge-handshake authentication protocol (CHAP), the authenticating comprising
   receiving a PANA Client Initiation (PCI) message having an unspecified Internet Protocol (IP) address as a source IP address from a host at a Network Access Server (NAS);
   sending a PANA-Auth-Request (PAR) using an IP broadcast address as a network layer destination IP address from the NAS to the host along with CHAP Challenge, Name and ID;
   receiving a PANA-Auth-Answer (PAN) message having the unspecified IP address as a source address from the host at the NAS along with CHAP Response, Name and ID, wherein the unspecified IP address and the IP broadcast address comprise IPv4 and IPv6, wherein the unspecified IP address has a value of 0.0.0.0 for IPv4, and wherein the IP broadcast address has a value of 0xffffffff for IPv4;

sending a RADIUS access-request message from the NAS to a RADIUS server along with CHAP Challenge, Name and ID; and receiving a RADIUS access-accept message at the NAS from the RDAIUS server along with CHAP Response, Name and ID.

8. The method of claim 7, wherein the host comprises a PANA-authentication-Client (PaC), the NAS comprises a PANA Authentication Agent (PAA), wherein the host is one hop away from the NAS.

9. A configuration method comprising:

configuring an Internet Protocol (IP) address from a Dynamic Host Configuration Protocol (DHCP) process in accordance with a simplified protocol for carrying authentication for network access (sPANA), the configuring comprising receiving a first DHCPDISCOVER message from a host at a network access server (NAS), the DHCPDISCOVER message having an unspecified Internet Protocol (IP) address as a source address;

transmitting a PANA-auth-Request (PAR) using an IP broadcast address as a network layer destination IP address at the NAS;

receiving a PANA-auth-Answer (PAN) having the unspecified IP address from the host at the NAS for completing the authentication, wherein the unspecified IP address and the IP broadcast address comprise IPv4 and IPv6, wherein the unspecified IP address has a value of 0.0.0.0 for IPv4, and wherein the IP broadcast address has a value of 0xffffffff for IPv4; and sending a second DHCPDISCOVER message from the NAS to a DHCP server to request an IP address.

10. The method of claim 9, further comprising:

sending a Remote Authentication Dial In User Service (RADIUS) access-Request from the NAS to gain access to the RADIUS server; and receiving a RADIUS access-accept message at the NAS from the RADIUS server.

11. The method of claim 9, wherein the DHCP server comprises DHCPv4 and DHCPv6.

12. The method of claim 9, further comprising usage of an authentication protocol in the sPANA, the authentication protocol comprising challenge-handshake authentication protocol (CHAP) and extensible authentication protocol (EAP).

13. A system comprising:

a network access server (NAS) configured to authenticate a communication entity in accordance with a protocol for carrying authentication for network access (PANA), the NAS having first and second physical ports coupled to a network, the NAS comprising a receiver coupled to the network via the first physical port to receive a first PANA message using an unspecified Internet Protocol (IP) address from a host or a PANA client (PaC); and a transmitter coupled to the network via the second physical port to transmit a second PANA message using an IP broadcast address as a network layer destination address to the host or the PaC, wherein the second PANA message comprises a PaC link layer destination address comprising a unicast Media Access Control (MAC) address.

14. The system of claim 13, wherein the first PANA message comprises PANA Client Initiation (PCI) and PANA-Auth-Answer (PAN).

15. The system of claim 13, wherein the second PANA message comprises PANA-Auth-Request (PAR).

16. The system of claim 13, wherein the unspecified IP address and the IP broadcast address comprise IPv4 and IPv6.

17. The system of claim 16, wherein the unspecified IP address has a value of 0.0.0.0 for IPv4.

18. The system of claim 16, wherein the IP broadcast address has a value of 0xffffffff for IPv4.

19. The system of claim 16, wherein the first and second physical ports are the same physical port.

* * * * *

UNITED STATES PATENT AND TRADEMARK OFFICE
CERTIFICATE OF CORRECTION

| | | |
|---|---|---|
| PATENT NO. | : 8,621,198 B2 | Page 1 of 1 |
| APPLICATION NO. | : 12/199985 | |
| DATED | : December 31, 2013 | |
| INVENTOR(S) | : Yangsong Xia | |

It is certified that error appears in the above-identified patent and that said Letters Patent is hereby corrected as shown below:

In the Claims

In Col. 9, line 10, claim 7, delete "RDAIUS" and insert --RADIUS--.

Signed and Sealed this
Fourth Day of March, 2014

Michelle K. Lee
*Deputy Director of the United States Patent and Trademark Office*